United States Patent
Maleki et al.

(10) Patent No.: US 12,289,723 B2
(45) Date of Patent: Apr. 29, 2025

(54) LAYER REDUCTION CRITERIA

(71) Applicant: Telefonaktiebolaget LM Ericsson (publ), Stockholm (SE)

(72) Inventors: Sina Maleki, Malmö (SE); Andres Reial, Lomma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 389 days.

(21) Appl. No.: 17/634,375

(22) PCT Filed: Aug. 12, 2020

(86) PCT No.: PCT/EP2020/072554
§ 371 (c)(1),
(2) Date: Feb. 10, 2022

(87) PCT Pub. No.: WO2021/028450
PCT Pub. Date: Feb. 18, 2021

(65) Prior Publication Data
US 2022/0304024 A1 Sep. 22, 2022

Related U.S. Application Data

(60) Provisional application No. 62/886,811, filed on Aug. 14, 2019.

(51) Int. Cl.
*H04W 72/1273* (2023.01)
*H04B 7/0452* (2017.01)
*H04L 5/00* (2006.01)

(52) U.S. Cl.
CPC ...... *H04W 72/1273* (2013.01); *H04B 7/0452* (2013.01); *H04L 5/0023* (2013.01); *H04L 5/0096* (2013.01)

(58) Field of Classification Search
CPC ......... H04W 72/1268; H04W 74/0841; H04W 74/0866; H04W 84/06; H04W 74/0833;
(Continued)

(56) References Cited

U.S. PATENT DOCUMENTS

2015/0358060 A1* 12/2015 Park .................. H04L 1/06
370/329
2016/0219457 A1* 7/2016 Nammi ............. H04B 7/0404
(Continued)

FOREIGN PATENT DOCUMENTS

WO  WO-2018084971 A1 * 5/2018 ........ H04B 7/0473
WO      2019092684 A1    5/2019
(Continued)

OTHER PUBLICATIONS

International Search Report and Written Opinion dated Oct. 15, 2020 for International Application No. PCT/EP2020/072554 filed Aug. 12, 2020, consisting of 9 pages.
(Continued)

Primary Examiner — Nathan S Taylor
(74) Attorney, Agent, or Firm — Weisberg I.P. Law, P.A.

(57) ABSTRACT

Methods and apparatuses are disclosed for layer reduction criteria. In one embodiment, a network node is configured to determine a number of multiple-input multiple-output, MIMO, layers for a wireless device, WD, the determined number of MIMO layers being adjusted as compared to a maximum number of MIMO layers for the wireless device based at least in part on at least one parameter associated with at least one of the wireless device and the network node; and signal an indication of the determined number of MIMO layers to the wireless device. In one embodiment, a wireless device is configured to receive an indication of a number of multiple-input multiple-output, MIMO, layers, the indicated number of MIMO layers being adjusted as
(Continued)

compared to a maximum number of MIMO layers for the wireless device based at least in part on at least one parameter associated with at least one of the wireless device and a network node.

17 Claims, 6 Drawing Sheets

(58) Field of Classification Search
CPC . H04W 72/12; H04W 74/08; H04W 72/1273; H04B 7/0452; H04B 7/0486; H04B 7/0626; H04B 7/0628; H04B 7/063; H04B 7/0697; H04L 5/0023; H04L 5/0096; H04L 5/00
See application file for complete search history.

(56) References Cited

U.S. PATENT DOCUMENTS

| | | | | |
|---|---|---|---|---|
| 2016/0323020 A1* | 11/2016 | Zhang | | H04B 7/0645 |
| 2016/0374069 A1* | 12/2016 | Palm | | H04W 72/51 |
| 2020/0029315 A1* | 1/2020 | Lin | | H04W 24/08 |
| 2020/0322013 A1* | 10/2020 | Gao | | H04L 5/0051 |
| 2021/0105108 A1* | 4/2021 | Abdelghaffar | | H04L 5/001 |
| 2021/0111775 A1* | 4/2021 | Abdelghaffar | | H04B 7/0634 |
| 2021/0120489 A1* | 4/2021 | Jiang | | H04W 24/02 |
| 2021/0136690 A1* | 5/2021 | Zhou | | H04W 52/0229 |
| 2021/0360532 A1* | 11/2021 | Jiang | | H04W 52/0229 |
| 2021/0400589 A1* | 12/2021 | Yiu | | H04W 24/10 |
| 2022/0022176 A1* | 1/2022 | Chen | | H04W 72/23 |
| 2022/0166594 A1* | 5/2022 | Zhang | | H04W 72/21 |
| 2022/0174592 A1* | 6/2022 | Zhang | | H04W 52/0212 |
| 2022/0182942 A1* | 6/2022 | Guo | | H04W 52/0235 |
| 2022/0240187 A1* | 7/2022 | Guo | | H04L 5/0053 |
| 2022/0311478 A1* | 9/2022 | Sun | | H04B 7/0695 |
| 2022/0312440 A1* | 9/2022 | Bagheri | | H04W 72/044 |
| 2022/0369225 A1* | 11/2022 | Iyer | | H04W 52/0216 |
| 2023/0066448 A1* | 3/2023 | Tseng | | H04W 74/0808 |
| 2023/0087902 A1* | 3/2023 | Zheng | | H04W 8/22 370/329 |

FOREIGN PATENT DOCUMENTS

| | | | | |
|---|---|---|---|---|
| WO | WO-2021030942 A1 * | 2/2021 | ........ | H04W 52/0216 |
| WO | WO-2021067444 A2 * | 4/2021 | ........... | H04B 7/0626 |

OTHER PUBLICATIONS

3GPP TS 38.211 V15.6.0; 3rd Generation Partnership Project; Technical Specification Group Radio Access Network; NR; Physical channels and modulation (Release 15); Jun. 2019, consisting of 97 pages.

* cited by examiner

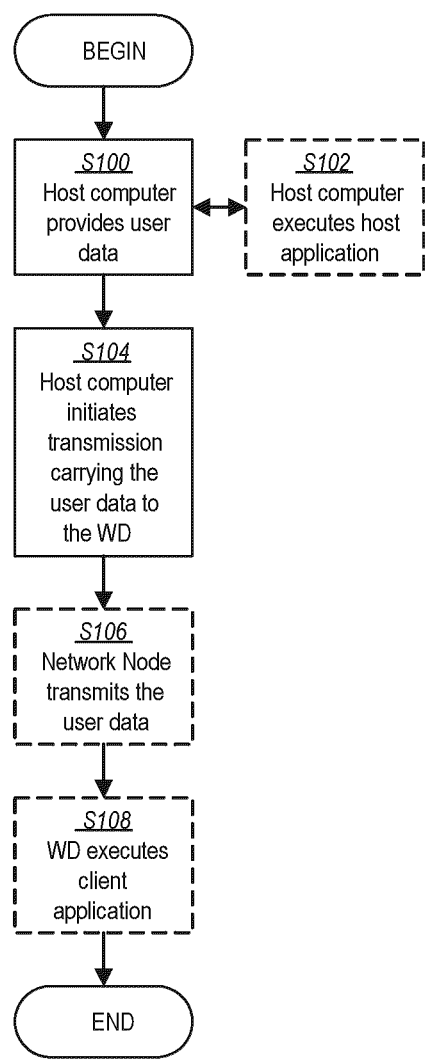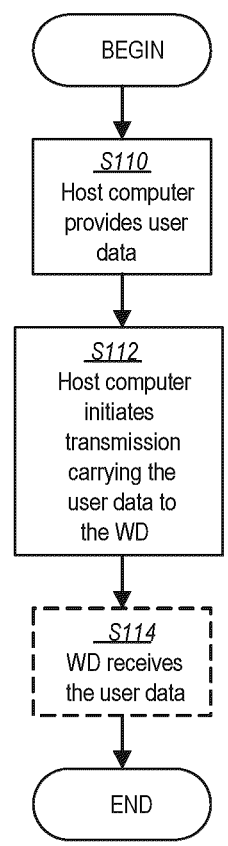
FIG. 3
FIG. 4

LAYER REDUCTION CRITERIA

CROSS-REFERENCE TO RELATED APPLICATIONS

This application is a Submission Under 35 U.S.C. § 371 for U.S. National Stage Patent Application of International Application No.: PCT/EP2020/072554, filed Aug. 12, 2020, entitled "LAYER REDUCTION CRITERIA," which claims priority to U.S. Provisional Application No. 62/886,811, filed Aug. 14, 2019, entitled "LAYER REDUCTION CRITERIA AT NETWORK NODE," the entireties of both of which are incorporated herein by reference.

TECHNICAL FIELD

The present disclosure relates to wireless communication and in particular, to layer reduction criteria at a network node.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

A core component in 3rd Generation Partnership Project (3GPP) New Radio (NR) (also known as "5G") is the support of MIMO antenna deployments and MIMO related techniques including beamforming at higher carrier frequencies. Currently LTE and NR support an 8-layer spatial multiplexing mode to a single wireless device (WD) for up to 32 transmit (Tx) antennas with channel dependent precoding. The spatial multiplexing mode is aimed for high data rates in favorable channel conditions. Each MIMO layer may be used to transmit the same transport block (TB), or each MIMO layer may be used to transmit a different TB.

Physical downlink shared channel (PDSCH) is the physical channel used for transmitting the downlink shared channel data to a wireless device (WD), such as, a user equipment (UE). The transmission over PDSCH can be based on multi-layer transmission, employing spatial processing among several antennas (antenna ports). In the 3rd Generation Partnership Project (3GPP) New Radio (NR) (also known as "5G") standards, a downlink (DL) transmission, i.e., from network node to WD, can be up to 4 layers for a single codeword (CW), or up to 8 layers for a two codewords (CW) transmission.

The WD is configured via higher layers to expect a maximum number of layers per cell for DL transmission in 3GPP Release 15 (Rel 15), and it has been considered to extend this to per bandwidth part (BWP) in 3GPP Release 16 (Rel 16). Furthermore, the WD can become aware of the exact number of layers the current data is transmitted after decoding a scheduling downlink control information (DCI) of format 1-1.

The network node (e.g., gNB) mostly determines the maximum number of layers per cell or per BWP, based on long term channel conditions obtained from WD channel state information (CSI) reports or sounding reference signal (SRS) transmissions. Furthermore, the network node takes instantaneous channel conditions into account while determining the current number of layers employed for data transmission to the WD.

For long term conditions, the network node (e.g., gNB) may configure the maximum number of layers through radio resource control (RRC) signaling, while the network node can use scheduling DCI format 1-1 for instantaneous layer adaptation.

SUMMARY

Some embodiments advantageously provide methods, systems, and apparatuses for layer reduction criteria at a network node.

In one embodiment, a method implemented in a network node is provided. The method includes one or more of: determining a number of multiple-input multiple-output (MIMO) layers for the WD based at least in part on one or more parameters associated with the WD and/or the network node, the determined number of MIMO layers being adjusted as compared to a maximum number of MIMO layers associated with the WD; signaling an indication of the determined number of MIMO layers to the WD; and/or scheduling and/or transmitting a downlink (DL) channel to the WD based at least in part on the determined number of MIMO layers.

In another embodiment, a method implemented in a wireless device (WD) is provided. The method includes one or more of: receiving an indication of a number of multiple-input multiple-output (MIMO) layers, the indicated number of MIMO layers being determined based at least in part on one or more parameters associated with the WD and/or the network node and/or the indicated number of MIMO layers being adjusted as compared to a maximum number of MIMO layers associated with the WD; and/or receiving a downlink (DL) channel transmission based at least in part on the determined number of MIMO layers.

According to an aspect of the present disclosure, a method implemented in a network node is provided. The method includes determining a number of multiple-input multiple-output, MIMO, layers for a wireless device, WD, the determined number of MIMO layers being adjusted as compared to a maximum number of MIMO layers for the wireless device based at least in part on at least one parameter associated with at least one of the wireless device and the network node; and signaling an indication of the determined number of MIMO layers to the wireless device.

In some embodiments of this aspect, the method further includes at least one of: scheduling the wireless device according to the determined number of MIMO layers; and transmitting a downlink, DL, channel to the wireless device according to the determined number of MIMO layers. In some embodiments of this aspect, determining the number of MIMO layers for the wireless device further includes determining to one of reduce and increase the number of MIMO layers for scheduling the wireless device as compared to the maximum number of MIMO layers for the wireless device based at least in part on the at least one parameter.

In some embodiments of this aspect, the at least one parameter includes pending downlink, DL, traffic to the wireless device. In some embodiments of this aspect, the at least one parameter includes expected downlink, DL, traffic to the wireless device. In some embodiments of this aspect, the at least one parameter includes a wireless device power savings gain; and the method further comprises determining the wireless device power savings gain associated with the determined number of MIMO layers. In some embodiments of this aspect, the at least one parameter includes a network node performance impact; and the method further comprises determining the network node performance impact associated with the determined number of MIMO layers. In some embodiments of this aspect, the at least one parameter includes a MIMO transmission robustness; and the method further comprises determining the MIMO transmission robustness associated with the determined number of MIMO layers.

In some embodiments of this aspect, the at least one parameter includes at least one channel state information, CSI, report from the wireless device. In some embodiments of this aspect, the at least one parameter includes at least one hybrid automatic repeat request, HARQ, indication from the wireless device. In some embodiments of this aspect, the at least one parameter includes at least one feedback indication from the wireless device. In some embodiments of this aspect, the at least one parameter includes at least one rank indication from the wireless device. In some embodiments of this aspect, the at least one parameter includes at least one modulation and coding scheme, MCS, for the wireless device.

In some embodiments of this aspect, the maximum number of MIMO layers for the wireless device is based on the wireless device capability. In some embodiments of this aspect, the maximum number of MIMO layers is configured to the wireless device via radio resource control, RRC, signaling; and the indication of the determined number of MIMO layers is signaled to the wireless device via one of a downlink control information, DCI, message and an RRC message. In some embodiments of this aspect, the maximum number of MIMO layers is configured to the wireless device at least one of per cell and per bandwidth part, BWP. In some embodiments of this aspect, the indication of the determined number of MIMO layers is signaled to the wireless device via a downlink control information, DCI, message including an indication to switch an active bandwidth part, BWP.

According to another aspect of the present disclosure, a method implemented in a wireless device is provided. The method includes receiving an indication of a number of multiple-input multiple-output, MIMO, layers, the indicated number of MIMO layers being adjusted as compared to a maximum number of MIMO layers for the wireless device based at least in part on at least one parameter associated with at least one of the wireless device and a network node.

In some embodiments of this aspect, the method further includes receiving a scheduling for the wireless device according to the indicated number of MIMO layers; and receiving a downlink, DL, channel according to the indicated number of MIMO layers. In some embodiments of this aspect, the indicated number of MIMO layers is one of reduced and increased as compared to the maximum number of MIMO layers for the wireless device based at least in part on the at least one parameter.

In some embodiments of this aspect, the at least one parameter includes pending downlink, DL, traffic to the wireless device. In some embodiments of this aspect, the at least one parameter includes expected downlink, DL, traffic to the wireless device. In some embodiments of this aspect, the at least one parameter includes a wireless device power savings gain. In some embodiments of this aspect, the at least one parameter includes a network node performance impact. In some embodiments of this aspect, the at least one parameter includes a MIMO transmission robustness. In some embodiments of this aspect, the at least one parameter includes at least one channel state information, CSI, report from the wireless device; and the method further comprises transmitting the CSI report. In some embodiments of this aspect, the at least one parameter includes at least one hybrid automatic repeat request, HARQ, indication from the wireless device; and the method further comprises transmitting the at least one HARQ indication. In some embodiments of this aspect, the at least one parameter includes at least one feedback indication from the wireless device. In some embodiments of this aspect, the at least one parameter includes at least one rank indication from the wireless device; and the method further comprises transmitting the at least one rank indication. In some embodiments of this aspect, the at least one parameter includes at least one modulation and coding scheme, MCS, for the wireless device.

In some embodiments of this aspect, the maximum number of MIMO layers for the wireless device is based on the wireless device capability. In some embodiments of this aspect, the maximum number of MIMO layers is configured to the wireless device via radio resource control, RRC, signaling; and the indication of the number of MIMO layers is received via one of a downlink control information, DCI, message and an RRC message. In some embodiments of this aspect, the maximum number of MIMO layers is configured to the wireless device at least one of per cell and per bandwidth part, BWP. In some embodiments of this aspect, the indication of the determined number of MIMO layers is signaled to the wireless device via a downlink control information, DCI, message including an indication to switch an active bandwidth part, BWP.

According to yet another aspect of the present disclosure, a network node configured to communicate with a wireless device, WD, is provided. The network node includes processing circuitry. The processing circuitry is configured to cause the network node to determine a number of multiple-input multiple-output, MIMO, layers for a wireless device, WD, the determined number of MIMO layers being adjusted as compared to a maximum number of MIMO layers for the wireless device based at least in part on at least one parameter associated with at least one of the wireless device and the network node; and signal an indication of the determined number of MIMO layers to the wireless device.

In some embodiments of this aspect, the processing circuitry is further configured to at least one of: schedule the wireless device according to the determined number of MIMO layers; and transmit a downlink, DL, channel to the wireless device according to the determined number of MIMO layers. In some embodiments of this aspect, the processing circuitry is configured to determine the number of MIMO layers for the wireless device by being configured to cause the network node to determine to one of reduce and increase the number of MIMO layers for scheduling the wireless device as compared to the maximum number of MIMO layers for the wireless device based at least in part on the at least one parameter.

In some embodiments of this aspect, the at least one parameter includes pending downlink, DL, traffic to the wireless device. In some embodiments of this aspect, the at least one parameter includes expected downlink, DL, traffic to the wireless device. In some embodiments of this aspect, the at least one parameter includes a wireless device power savings gain; and the processing circuitry is further configured to cause the network node to determine the wireless device power savings gain associated with the determined number of MIMO layers. In some embodiments of this aspect, the at least one parameter includes a network node performance impact; and the processing circuitry is further configured to cause the network node to determine the network node performance impact associated with the determined number of MIMO layers. In some embodiments of this aspect, the at least one parameter includes a MIMO transmission robustness; and the processing circuitry is further configured to cause the network node to determine the MIMO transmission robustness associated with the determined number of MIMO layers.

In some embodiments of this aspect, the at least one parameter includes at least one channel state information, CSI, report from the wireless device. In some embodiments of this aspect, the at least one parameter includes at least one hybrid automatic repeat request, HARQ, indication from the wireless device. In some embodiments of this aspect, the at least one parameter includes at least one feedback indication from the wireless device. In some embodiments of this aspect, the at least one parameter includes at least one rank indication from the wireless device. In some embodiments of this aspect, the at least one parameter includes at least one modulation and coding scheme, MCS, for the wireless device.

In some embodiments of this aspect, the maximum number of MIMO layers for the wireless device is based on the wireless device capability. In some embodiments of this aspect, the maximum number of MIMO layers is configured to the wireless device via radio resource control, RRC, signaling; and the indication of the determined number of MIMO layers is signaled to the wireless device via one of a downlink control information, DCI, message and an RRC message. In some embodiments of this aspect, the maximum number of MIMO layers is configured to the wireless device at least one of per cell and per bandwidth part, BWP. In some embodiments of this aspect, the indication of the determined number of MIMO layers is signaled to the wireless device via a downlink control information, DCI, message including an indication to switch an active bandwidth part, BWP.

According to another aspect of the present disclosure, a wireless device, WD, configured to communicate with a network node is provided. The wireless device includes processing circuitry. The processing circuitry is configured to cause the wireless device to receive an indication of a number of multiple-input multiple-output, MIMO, layers, the indicated number of MIMO layers being adjusted as compared to a maximum number of MIMO layers for the wireless device based at least in part on at least one parameter associated with at least one of the wireless device and a network node.

In some embodiments of this aspect, the processing circuitry is further configured to receive a scheduling for the wireless device according to the indicated number of MIMO layers; and receive a downlink, DL, channel according to the indicated number of MIMO layers. In some embodiments of this aspect, the indicated number of MIMO layers is one of reduced and increased as compared to the maximum number of MIMO layers for the wireless device based at least in part on the at least one parameter. In some embodiments of this aspect, the at least one parameter includes pending downlink, DL, traffic to the wireless device. In some embodiments of this aspect, the at least one parameter includes expected downlink, DL, traffic to the wireless device. In some embodiments of this aspect, the at least one parameter includes a wireless device power savings gain. In some embodiments of this aspect, the at least one parameter includes a network node performance impact. In some embodiments of this aspect, the at least one parameter includes a MIMO transmission robustness.

In some embodiments of this aspect, the at least one parameter includes at least one channel state information, CSI, report from the wireless device; and the processing circuitry is further configured to cause the wireless device to transmit the CSI report. In some embodiments of this aspect, the at least one parameter includes at least one hybrid automatic repeat request, HARQ, indication from the wireless device; and the processing circuitry is further configured to cause the wireless device to transmit the at least one HARQ indication. In some embodiments of this aspect, the at least one parameter includes at least one feedback indication from the wireless device. In some embodiments of this aspect, the at least one parameter includes at least one rank indication from the wireless device; and the processing circuitry is further configured to cause the wireless device to the at least one rank indication. In some embodiments of this aspect, the at least one parameter includes at least one modulation and coding scheme, MCS, for the wireless device. In some embodiments of this aspect, the maximum number of MIMO layers for the wireless device is based on the wireless device capability.

In some embodiments of this aspect, the maximum number of MIMO layers is configured to the wireless device via radio resource control, RRC, signaling; and the indication of the number of MIMO layers is received via one of a downlink control information, DCI, message and an RRC message. In some embodiments of this aspect, the maximum number of MIMO layers is configured to the wireless device at least one of per cell and per bandwidth part, BWP. In some embodiments of this aspect, the indication of the determined number of MIMO layers is signaled to the wireless device via a downlink control information, DCI, message including an indication to switch an active bandwidth part, BWP.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

DETAILED DESCRIPTION

Figure 1:
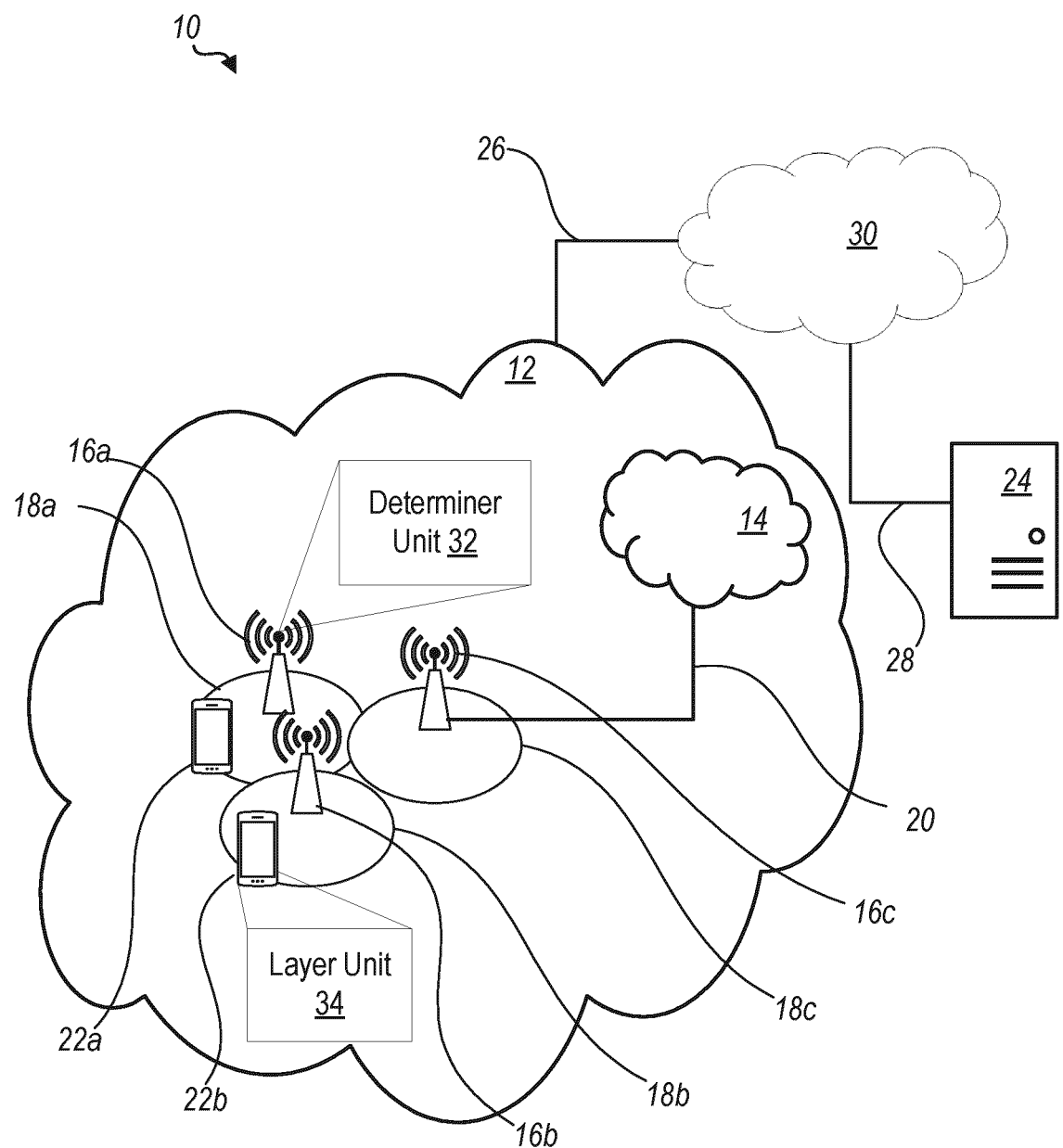
FIG. 1 is a schematic diagram of an exemplary network architecture illustrating a communication system connected via an intermediate network to a host computer according to the principles in the present disclosure.

Multi-layer transmission has shown to improve transmission throughput in the presence of good channel conditions as compared with single layer transmission. However, this improvement may come at the cost of increasing the WD power consumption due to additional antennas and baseband processing. Optimizing solely for maximum throughput may lead to unfavorable energy consumption trade-offs at the WD.

Currently, there exists a mechanism whereby the network node (e.g., gNB) can indicate a maximum number of multiple-input multiple-output (MIMO) layers that the network node (e.g., gNB) will schedule that may be lower than the WD capability. A default use of the mechanism is in response to the WD indicating a special preference for power saving (PS) operation. However, the WD PS aspect alone may be insufficient for the network node to commit to a reduced number of layers since, in many scenarios, the network impact should also be considered.

Therefore, it may be useful for efficient criteria with which the network node (e.g., gNB) can decide/determine to reduce the number of layers to ensure resource-reliability and energy-efficient reception of downlink signals, e.g., PDSCH.

Some embodiments of the present disclosure provide criteria with which the network node (e.g., gNB) may decide/determine whether or not and/or how to semi-dynamically/semi-statically reduce the maximum number of MIMO layers for a WD. The reduction may be determined at time scales slower than fast fading, but with dynamics sufficient to track changes in operating conditions.

Particularly, in some embodiments, the network node (e.g., gNB) may decide/determine to reduce the number of layers if one or more of:

1—No large traffic is expected or buffered/queued to be delivered (e.g., to WD); and/or 2—Sudden change of channel conditions is expected, e.g., the WD is rapidly mobile, change of BWP, etc.

Some embodiments of the present disclosure may advantageously provide the network node (e.g., gNB) with efficient criteria to decide on lowering the maximum number of scheduled layers, thereby avoiding unsuccessful or inefficient PDSCH reception at the WD, which can enable additional power savings at the WD side, and efficient utilization of resources at the network node (e.g., gNB) side.

Before describing in detail exemplary embodiments, it is noted that the embodiments reside primarily in combinations of apparatus components and processing steps related to layer reduction criteria at a network node (e.g., gNB). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

As used herein, the term "constraint" is used interchangeably with and/or may indicate a threshold, a maximum number or value, a number or value, a restriction, a limitation, a configuration, a requirement, an indication, a control information, and the like. In some embodiments, the constraint disclosed herein may be determined by a network node according to the techniques disclosed herein and/or an indication of the determined constraint may be signaled to a WD to which the constraint relates to. In other embodiments, the constraint may mean other things.

As used herein, the term "criteria" may be used interchangeably with and/or may indicate a parameter or other measurement factor or numerical factor that sets a condition for whether to and/or how to use and/or what to base the determination of the constraints according to the techniques disclosed herein to e.g., determine a number of layers. In some embodiments, the criteria/parameters may include one or more of: WD power savings gains, network node performance impact, pending DL traffic to the WD, expected DL traffic to the WD, historical traffic patterns, MIMO transmission robustness, HARQ indication(s), WD feedback, channel state information (CSI) report(s), rank indication and/or modulation and coding scheme (MCS), discussed in more detail below. In other embodiments, the criteria may mean other things.

As used herein, the term "adjustment" may mean increasing or decreasing or maintaining a number of MIMO layers according to the techniques disclosed herein.

As used herein, the shortened term "layer" as used on its own may be used to indicate a MIMO layer.

In some embodiments, control information on one or more resources may be considered to be transmitted in a message having a specific format. A message may comprise or represent bits representing payload information and coding bits, e.g., for error coding.

Receiving (or obtaining) information may comprise receiving one or more control information messages (e.g., an RRC parameter, or DCI). It may be considered that receiving signaling comprises demodulating and/or decoding and/or detecting, e.g. blind detection of, one or more messages, in particular a message carried by the signaling, e.g. based on an assumed set of resources, which may be searched and/or listened for the information. It may be assumed that both sides of the communication are aware of the configurations, and may determine the set of resources, e.g. based on the reference size.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD with a limited number of MIMO layers according to embodiments of the present disclosure.

Although the description herein may be explained in the context of a downlink channel, such as PDSCH, it should be understood that the principles may also be applicable to other channels.

Any two or more embodiments described in this disclosure may be combined in any way with each other. Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for layer reduction criteria at a network node (e.g., gNB). Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a determiner unit 32 which is configured to determine a number of multiple-input multiple-output, MIMO, layers for a wireless device, WD, the determined number of MIMO layers being adjusted as compared to a maximum number of MIMO layers for the wireless device based at least in part on at least one parameter associated with at least one of the wireless device and the network node; and signal an indication of the determined number of MIMO layers to the wireless device. In some embodiments, the network node 16 includes determiner unit 32 which is configured to determine a number of multiple-input multiple-output (MIMO) layers for the WD based at least in part on one or more parameters associated with the WD and/or the network node, the determined number of MIMO layers being adjusted as compared to a maximum number of MIMO layers associated with the WD; signal in an indication of the determined number of MIMO layers to the WD; and/or schedule and/or transmit a downlink (DL) channel to the WD based at least in part on the determined number of MIMO layers.

A wireless device 22 is configured to include a layer unit 34 which is configured to receive an indication of a number of multiple-input multiple-output, MIMO, layers, the indicated number of MIMO layers being adjusted as compared to a maximum number of MIMO layers for the wireless device based at least in part on at least one parameter associated with at least one of the wireless device and a network node. In some embodiments, the wireless device 22 is configured to include a layer unit 34 which is configured to receive an indication of a number of multiple-input multiple-output (MIMO) layers, the indicated number of MIMO layers being determined based at least in part on one or more parameters associated with the WD and/or the network node and/or the indicated number of MIMO layers being adjusted as compared to a maximum number of MIMO layers associated with the WD; and/or receive a downlink (DL) channel transmission based at least in part on the determined number of MIMO layers.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50.

The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include determiner unit 32 configured to perform the network node methods disclosed herein such as those discussed with reference to FIG. 7 as well as the other figures and throughout the disclosure.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a layer unit 34 configured to perform the WD methods disclosed herein such as those discussed with reference to FIG. 8 as well as the other figures and throughout the disclosure.

Figure 2:
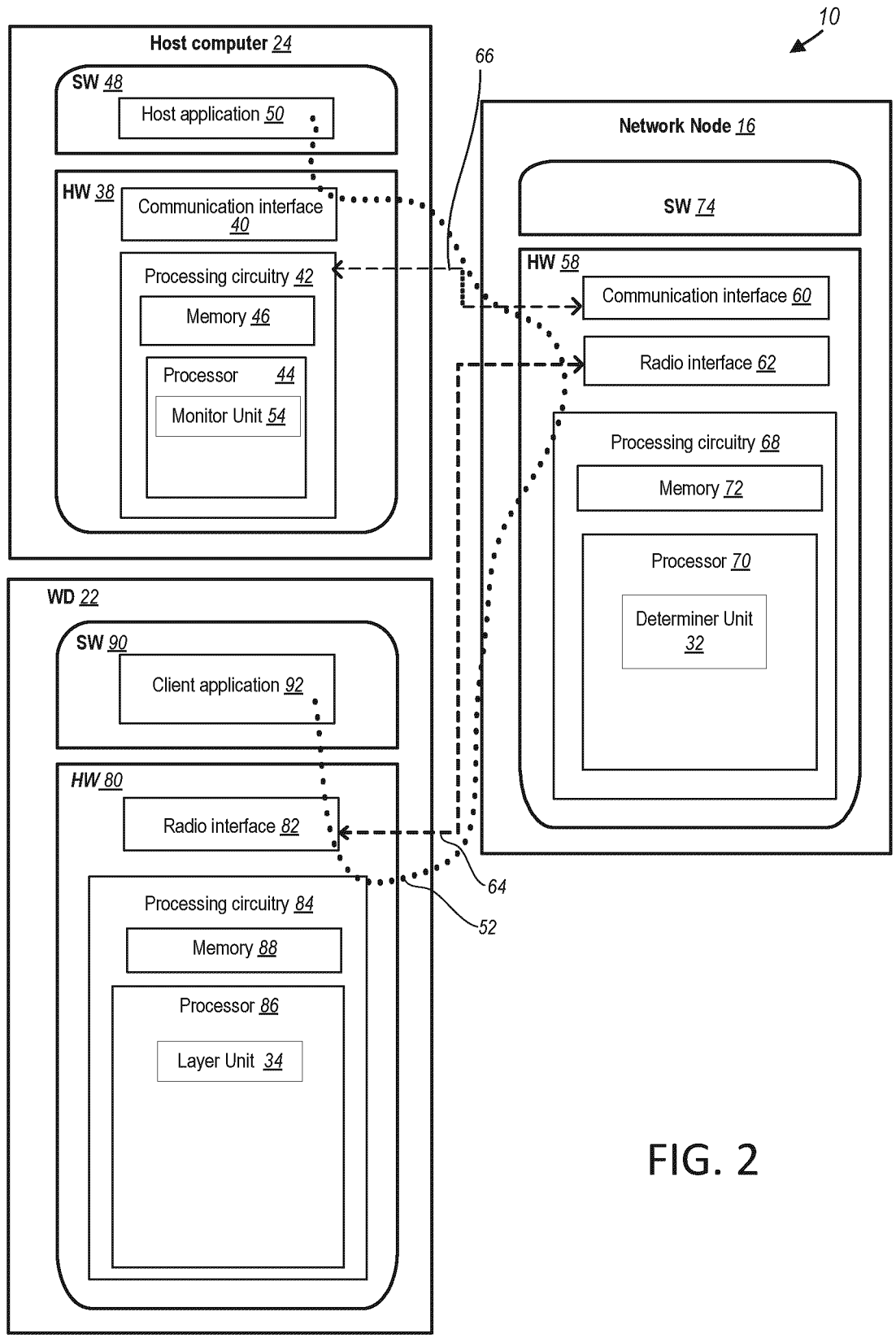
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as determiner unit 32, and layer unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
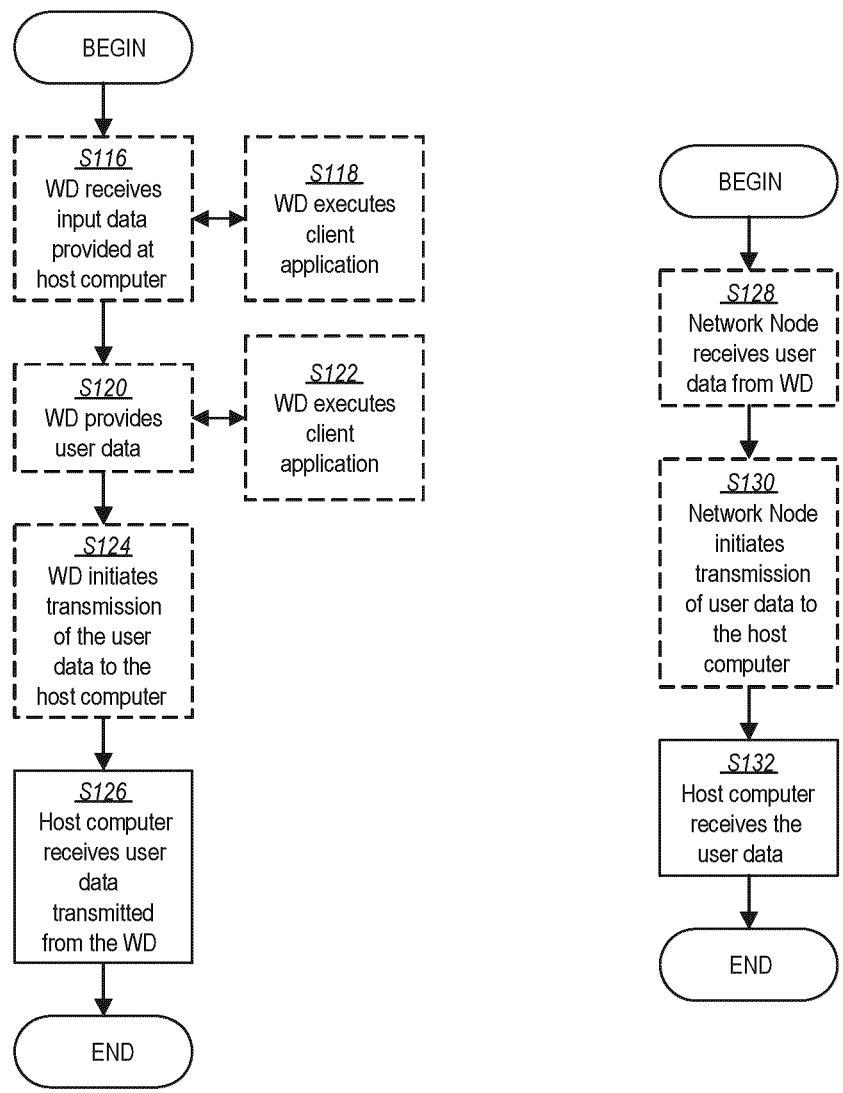
FIG. 5 is a flowchart illustrating exemplary methods implemented in a communication system including a host computer, a network node and a wireless device for receiving user data from the wireless device at a host computer according to some embodiments of the present disclosure.
FIG. 6 is a flowchart illustrating exemplary methods implemented in a communication system including a host computer, a network node and a wireless device for receiving user data at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
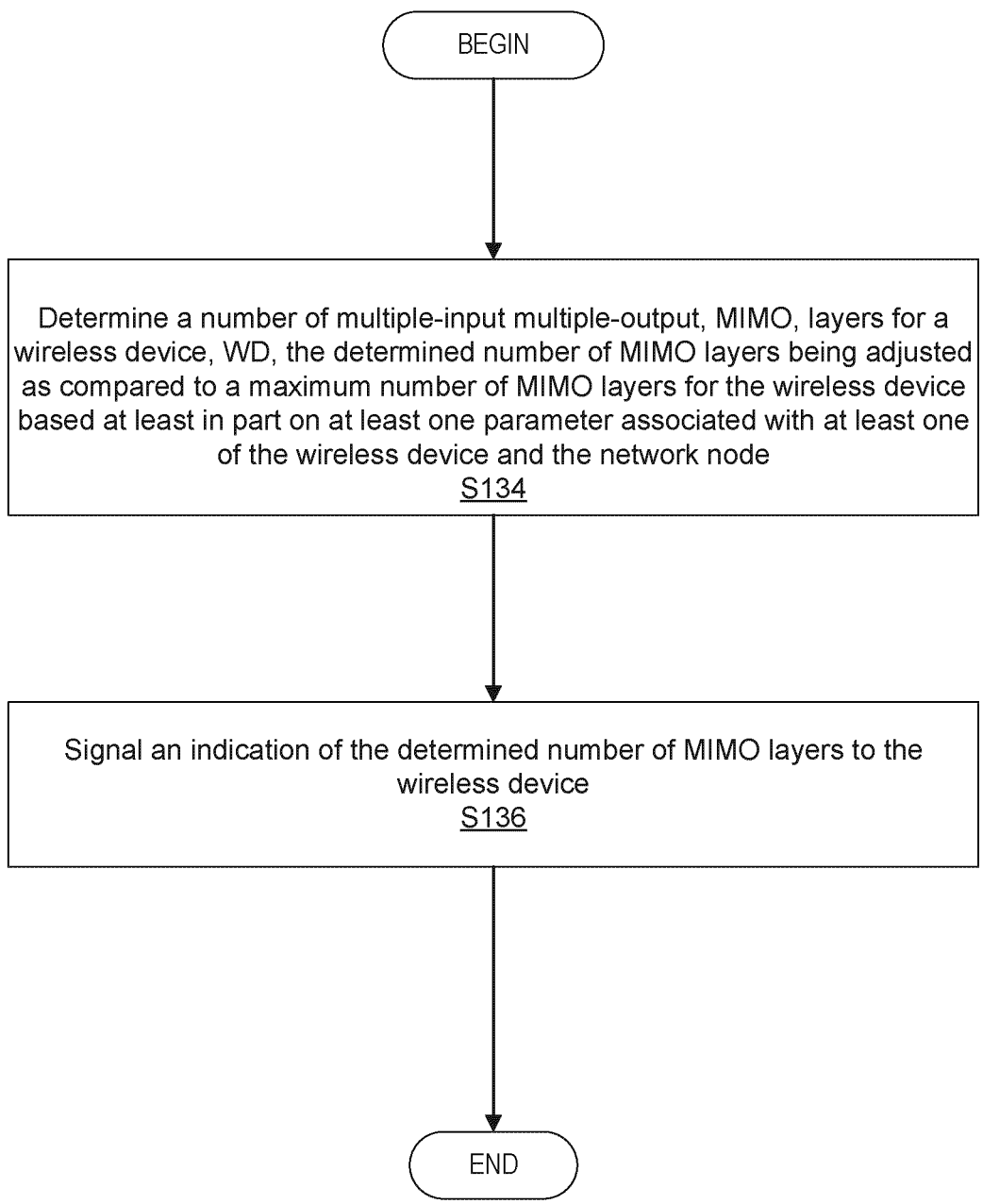
FIG. 7 is a flowchart of an exemplary process in a network node for determine unit according to some embodiments of the present disclosure.

FIG. 7 is a flowchart of an exemplary process in a network node 16 for layer reduction criteria according to some embodiments of the present disclosure. One or more Blocks and/or functions and/or methods performed by the network node 16 may be performed by one or more elements of network node 16 such as by determiner unit 32 in processing circuitry 68, processor 70, radio interface 62, etc. according to the example method. The example method includes determining (Block S134), such as via determiner unit 32, processing circuitry 68, processor 70, communication interface 60 and/or radio interface 62, a number of multiple-input multiple-output, MIMO, layers for a wireless device, WD, the determined number of MIMO layers being adjusted as compared to a maximum number of MIMO layers for the wireless device based at least in part on at least one parameter associated with at least one of the wireless device and the network node. The method includes signaling (Block S136), such as via determiner unit 32, processing circuitry 68, processor 70, communication interface 60 and/or radio interface 62, an indication of the determined number of MIMO layers to the wireless device 22.

In some embodiments, the method further includes scheduling, such as via determiner unit 32, processing circuitry 68, processor 70, communication interface 60 and/or radio interface 62, the wireless device 22 according to the determined number of MIMO layers. In some embodiments, the method further includes transmitting, such as via determiner unit 32, processing circuitry 68, processor 70, communication interface 60 and/or radio interface 62, a downlink, DL, channel to the wireless device 22 according to the determined number of MIMO layers. In some embodiments, determining the number of MIMO layers for the wireless device further includes determining, such as via determiner unit 32, processing circuitry 68, processor 70, communication interface 60 and/or radio interface 62, to one of reduce and increase the number of MIMO layers for scheduling the wireless device 22 as compared to the maximum number of MIMO layers for the wireless device 22 based at least in part on the at least one parameter.

In some embodiments, the at least one parameter includes pending downlink, DL, traffic to the wireless device 22. In some embodiments, the at least one parameter includes expected downlink, DL, traffic to the wireless device 22. In some embodiments, the at least one parameter includes a wireless device power savings gain; and the method further comprises determining, such as via determiner unit 32, processing circuitry 68, processor 70, communication interface 60 and/or radio interface 62, the wireless device power savings gain associated with the determined number of MIMO layers. In some embodiments, the at least one parameter includes a network node performance impact; and the method further comprises determining, such as via determiner unit 32, processing circuitry 68, processor 70, communication interface 60 and/or radio interface 62, the network node performance impact associated with the determined number of MIMO layers.

In some embodiments, the at least one parameter includes a MIMO transmission robustness; and the method further comprises determining, such as via determiner unit 32, processing circuitry 68, processor 70, communication interface 60 and/or radio interface 62, the MIMO transmission robustness associated with the determined number of MIMO layers. In some embodiments, the at least one parameter includes at least one channel state information, CSI, report from the wireless device 22. In some embodiments, the at least one parameter includes at least one hybrid automatic repeat request, HARQ, indication from the wireless device 22. In some embodiments, the at least one parameter includes at least one feedback indication from the wireless device 22. In some embodiments, the at least one parameter includes at least one rank indication from the wireless device 22. In some embodiments, the at least one parameter includes at least one modulation and coding scheme, MCS, for the wireless device 22. In some embodiments, the maximum number of MIMO layers for the wireless device 22 is based on the wireless device capability.

In some embodiments, the maximum number of MIMO layers is configured to the wireless device 22 via radio resource control, RRC, signaling; and the indication of the determined number of MIMO layers is signaled, such as via determiner unit 32, processing circuitry 68, processor 70, communication interface 60 and/or radio interface 62, to the wireless device 22 via one of a downlink control information, DCI, message and an RRC message. In some embodiments, the maximum number of MIMO layers is configured to the wireless device 22 at least one of per cell and per bandwidth part, BWP. In some embodiments, the indication of the determined number of MIMO layers is signaled, such as via determiner unit 32, processing circuitry 68, processor 70, communication interface 60 and/or radio interface 62, to the wireless device 22 via a downlink control information, DCI, message including an indication to switch an active bandwidth part, BWP.

In some embodiments, the method includes determining, such as via determiner unit 32, processing circuitry 68, processor 70, communication interface 60 and/or radio interface 62, a number of multiple-input multiple-output (MIMO) layers for the WD based at least in part on one or more parameters associated with the WD and/or the network node, the determined number of MIMO layers being adjusted as compared to a maximum number of MIMO layers associated with the WD. The method includes signaling, such as via determiner unit 32, processing circuitry 68, processor 70 and/or radio interface 62, an indication of the determined number of MIMO layers to the WD 22. The method includes scheduling and/or transmitting, such as via determiner unit 32, processing circuitry 68, processor 70 and/or radio interface 62, a downlink (DL) channel to the WD 22 based at least in part on the determined number of MIMO layers.

In some embodiments, the one or more parameters includes at least one of WD power savings gains, network node performance impact, pending DL traffic to the WD, expected DL traffic to the WD, historical traffic patterns, MIMO transmission robustness, HARQ indication(s), WD feedback, channel state information (CSI) report(s), rank indication and/or modulation and coding scheme (MCS). In some embodiments, the maximum number of MIMO layers associated with the WD 22 being based on a WD capability. In some embodiments, the maximum number of MIMO layers associated with the WD being a radio resource control (RRC) configured maximum number of MIMO layers for scheduling the WD 22. In some embodiments, the method further comprises signaling the indication semi-dynamically and/or semi-statically. In some embodiments, the method further includes signaling via radio resource control (RRC) signaling and/or a downlink control information (DCI) message field. In some embodiments, the method further includes determining by determining, such as via determiner unit 32, processing circuitry 68, processor 70 and/or radio interface 62, whether to reduce or increase the number of MIMO layers for scheduling the WD 22 based at least in part on the one or more parameters.

Figure 8:
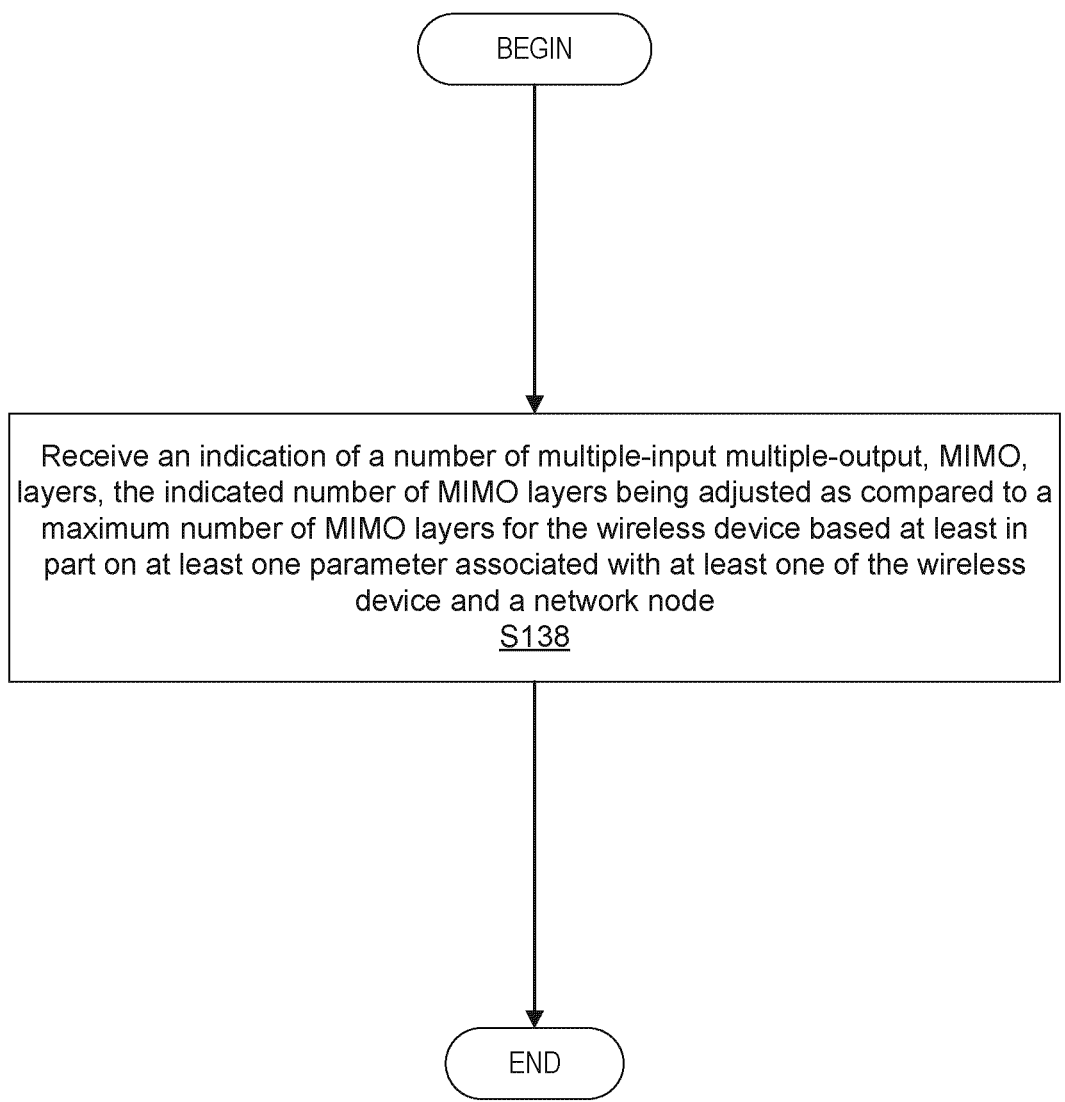
FIG. 8 is a flowchart of an exemplary process in a wireless device for layer unit according to some embodiments of the present disclosure.

FIG. 8 is a flowchart of an exemplary process in a wireless device 22 for layer reduction criteria according to some embodiments of the present disclosure. One or more Blocks and/or functions and/or methods performed by WD 22 may be performed by one or more elements of WD 22 such as by layer unit 34 in processing circuitry 84, processor 86, radio interface 82, etc. The example method includes receiving (Block S138), such as via layer unit 34, processing circuitry 84, processor 86 and/or radio interface 82, an indication of a number of multiple-input multiple-output, MIMO, layers, the indicated number of MIMO layers being adjusted as compared to a maximum number of MIMO layers for the wireless device 22 based at least in part on at least one parameter associated with at least one of the wireless device 22 and a network node 16.

In some embodiments, the method further includes receiving, such as via layer unit 34, processing circuitry 84, processor 86 and/or radio interface 82, a scheduling for the wireless device 22 according to the indicated number of MIMO layers; and receiving, such as via layer unit 34, processing circuitry 84, processor 86 and/or radio interface 82, a downlink, DL, channel according to the indicated number of MIMO layers. In some embodiments, the indicated number of MIMO layers is one of reduced and increased as compared to the maximum number of MIMO layers for the wireless device 22 based at least in part on the at least one parameter. In some embodiments, the at least one parameter includes pending downlink, DL, traffic to the wireless device 22. In some embodiments, the at least one parameter includes expected downlink, DL, traffic to the wireless device 22. In some embodiments, the at least one parameter includes a wireless device power savings gain.

In some embodiments, the at least one parameter includes a network node performance impact. In some embodiments, the at least one parameter includes a MIMO transmission robustness. In some embodiments, the at least one parameter includes at least one channel state information, CSI, report from the wireless device 22; and the method further comprises transmitting, such as via layer unit 34, processing circuitry 84, processor 86 and/or radio interface 82, the CSI report. In some embodiments, the at least one parameter includes at least one hybrid automatic repeat request, HARQ, indication from the wireless device 22; and the method further comprises transmitting, such as via layer unit 34, processing circuitry 84, processor 86 and/or radio interface 82, the at least one HARQ indication.

In some embodiments, the at least one parameter includes at least one feedback indication from the wireless device 22. In some embodiments, the at least one parameter includes at least one rank indication from the wireless device 22; and the method further comprises transmitting, such as via layer unit 34, processing circuitry 84, processor 86 and/or radio interface 82, the at least one rank indication. In some embodiments, the at least one parameter includes at least one modulation and coding scheme, MCS, for the wireless device 22. In some embodiments, the maximum number of MIMO layers for the wireless device 22 is based on the wireless device capability. In some embodiments, the maximum number of MIMO layers is configured to the wireless device 22 via radio resource control, RRC, signaling; and the indication of the number of MIMO layers is received via one of a downlink control information, DCI, message and an RRC message. In some embodiments, the maximum number of MIMO layers is configured to the wireless device 22 at least one of per cell and per bandwidth part, BWP. In some embodiments, the indication of the determined number of MIMO layers is signaled to the wireless device 22 via a downlink control information, DCI, message including an indication to switch an active bandwidth part, BWP.

In some embodiments, the method includes receiving, such as via layer unit 34, processing circuitry 84, processor 86 and/or radio interface 82, an indication of a number of multiple-input multiple-output (MIMO) layers, the indicated number of MIMO layers being determined based at least in part on one or more parameters associated with the WD 22 and/or the network node 16 and/or the indicated number of MIMO layers being adjusted as compared to a maximum number of MIMO layers associated with the WD 22. The method includes receiving (Block S142), such as via layer unit 34, processing circuitry 84, processor 86 and/or radio interface 82, a downlink (DL) channel transmission based at least in part on the determined number of MIMO layers.

In some embodiments, the one or more parameters includes at least one of WD 22 power savings gains, network node 16 performance impact, pending DL traffic to the WD 22, expected DL traffic to the WD 22, historical traffic patterns, MIMO transmission robustness, HARQ indication (s), WD feedback, channel state information (CSI) report(s), rank indication and/or modulation and coding scheme (MCS). In some embodiments, the maximum number of MIMO layers associated with the WD 22 being based on a WD 22 capability. In some embodiments, the maximum number of MIMO layers associated with the WD 22 being a radio resource control (RRC) configured maximum number of MIMO layers for scheduling the WD 22. In some embodiments, the method further includes receiving, such as via layer unit 34, processing circuitry 84, processor 86 and/or radio interface 82, the indication semi-dynamically and/or semi-statically. In some embodiments, the method further includes receiving, such as via layer unit 34, processing circuitry 84, processor 86 and/or radio interface 82, the indication via radio resource control (RRC) signaling and/or a downlink control information (DCI) message field. In some embodiments, the indicated number of MIMO layers indicates a reduction or an increase in the number of MIMO layers for scheduling the WD 22 based at least in part on the one or more parameters.

Having described the general process flow of arrangements of the disclosure and having provided examples of hardware and software arrangements for implementing the processes and functions of the disclosure, the sections below provide details and examples of arrangements for layer reduction criteria at a network node (e.g., gNB), which may be implemented by the network node 16, wireless device 22 and/or host computer 24.

Some Principles

The number of receiver (RX) antennas and/or the maximum number of MIMO layers that a WD 22 is able to process are provided by the WD 22, such as via radio interface 82, in its WD capability information, e.g. via RRC signaling e.g., to the network node 16. A typical WD 22 may be capable of 4 layers, but constraints of 2 or 8 are also possible. These set an upper bound for the number of layers that the network node 16 (e.g., gNB) can schedule for the WD 22. To maximize the network resource usage, the network node 16 (e.g., gNB) generally prefers to schedule a WD 22 with as many MIMO layers as the network node-WD propagation channel is able to support favorably, subject to the above discussed WD capability constraint. In a default operating mode, the WD 22 then prepares to receive PDSCH, e.g., via radio interface 82, with the highest possible number of layers, implying that the WD 22 has all receiver (RX) branches in readiness already during PDCCH monitoring (e.g., if no cross-slot scheduling with sufficient latency is applied to turn on additional branches in time for PDSCH symbol reception).

However, in some cases, e.g., the amount of data to be scheduled to the WD 22 is small, and it may not be possible to fill all available layers during a slot, or extending the transmission duration is of a minor consequence to the network node 16. The network node 16 (e.g., via processing circuitry 68 and/or radio interface 62) may then configure the WD 22 such that the network node 16 will not schedule more than a predefined maximum number of layers for the WD 22 (although the WD 22 capability and the channel could support a higher number of layers) to thereby facilitate WD 22 power savings. Such layer constraints may be specified in a current cell, or in a current BWP.

According to some embodiments of the present disclosure, the network node 16 (e.g., via processing circuitry 68 and/or radio interface 62) performs one or more of the following steps:

Determine a constraint, such as a semi-dynamic or semi-static constraint, of the maximum useful or necessary number of MIMO layers for a WD 22 based on one or more criteria, such as pending or expected traffic, MIMO transmission robustness, channel conditions, etc.;

Signal the constraint, such as the semi-dynamic or semi-static constraint to the WD 22, e.g. via RRC signaling or performing BWP switching to a BWP with a suitable preconfigured constraint; and/or Transmit MIMO data to the WD 22 using the constraint.

Some embodiments of the present disclosure provide for the design of criteria for determining the layer constraints, such as in step S200. For example, the network node 16 may formulate criteria in terms of traffic, transmission conditions, etc., that justify MIMO transmission with a lower number of layers (than a WD 22 is capable of receiving/WD capability) without adversely affecting network node 16 performance, capacity, resources, etc. Multiple specific embodiments of such criteria and how they can be applied is provided below.

In some embodiments, the constraint of step S200 is only applied if the WD 22 has indicated a preference or a request for a special power saving (PS) operation. In some embodiments, step S210 is performed only if the constraint is determined to be lower than the WD 22 capability. In some embodiments, the constraint in step S200 may be re-evaluated periodically, or in response to detected changes in traffic arrival (e.g., data for a WD 22 for a PDSCH transmission has arrived at the network node 16 and/or is being in a network node 16 buffer) or other criteria.

Layer Reduction Based on Current DL Traffic Status

In one embodiment, the network node 16 may, such as for example, via processing circuitry 68, decide (or determine whether or not or how) to reduce the number of layers based on current DL traffic. In one approach, the network node 16 may view its current DL buffer for data for the WD 22 and decide if the number of layers should be reduced or not (e.g., based on pending DL traffic to the WD 22, in other words, how much data/payload is in the DL buffer for the WD 22). For example, in the beginning there might be a large load in the DL buffer for data for the WD 22, and the channel conditions (obtained via CSI report by the WD 22, or based on SRS measurements at the network node 16) may verify the reliability of using multiple layers. However, after a while the queue (e.g., DL buffer queue for data to be transmitted to the WD 22) reduces significantly, and the remaining data in the buffer may be delivered using a lower number of layers. In a related situation, the data burst offered in the DL buffer may be small, e.g. due to small packets related to e.g., a smartphone app communication and may fit in a small number of MIMO layers. In general, the useful number of layers may also depend on the network node 16 load and the available bandwidth (BW) for the WD 22 of interest. For example, if the WD 22 may be allocated a wider transmission BW, the utility or usefulness of additional MIMO layers is generally decreased and the threshold for the buffer size where the number of MIMO layers may be constrained may be a higher threshold. In deciding about reducing the number of layers, the network node 16 may consider additional criteria, e.g., the network node 16 throughput is to remain intact, or the network node 16 may, such as for example, via processing circuitry 68, reduce throughput negligibly (with a margin set by the network node 16 for example); or WD 22 power consumption may be additional criteria, or a trade-off of different criteria with different weights may be used by the network node 16 for determining whether or not to reduce the number of layers (and/or by how much). For example, one or more criteria/parameters may have a weight that is higher than a weight applied to other criteria/parameters.

In some embodiments, the network node 16 may, such as for example, via processing circuitry 68, decide to reduce the number of layers either instantaneously employing the scheduling DCI (e.g., the DCI scheduling the PDSCH), or a change in the configuration of the number of layers may be performed via RRC signaling, e.g., the maximum number of layers per cell, per BWP, etc. In one example approach, if the change in the traffic load is faster than the time needed for an RRC configuration or reconfiguration, the network node 16 may decide to apply layer reduction through a DCI; while if the change in the traffic load takes longer than an RRC configuration or reconfiguration, and/or is stable afterwards, the network node 16 may resort to RRC configuration or reconfiguration.

Layer Reduction Based on Previously Observed DL Traffic Patterns

In another traffic-based approach, the network node 16 may rely on historical behavior of the WD 22 or expected WD 22 DL traffic either based on e.g., WD 22 requests, or explicit indication by the WD 22 via radio interface 82, in a sort of traffic assistance information. As such, the network node 16 may have a better overview of the current, as well as, expected traffic load. For example, the network node 16 may note (or observe or determine or learn or be configured such that) that overnight, the WD 22 does not have a large traffic load, and thus, the network node 16 may determine to lower the number of layers during such time period based on such expectation of the DL traffic load on WD 22 (e.g., in the evening based on the time zone in which the cell, network node, and/or WD 22 is located).

Similarly, the network node 16 may note (or observe or determine or learn or be configured such that), or receive WD 22 assistance information, that currently active applications (apps) at the WD 22 (e.g., client applications 92) only offer traffic having small packets and low total volumes. As in the previous approach, the network node 16 may also take additional criteria into account, e.g., network node 16 throughput, WD 22 power consumption, trade-off of the various criteria, etc. Furthermore, the network node 16 may determine to employ RRC reconfiguration if the expected low traffic behavior is stable over a longer time duration (e.g., between 1 am till 6 am, or other times), or high-volume traffic can be handled with occasional BWP changes with higher numbers of layers. For example, the WD 22 may determine to configure (e.g., via RRC signaling) the active BWP of the WD 22 with a lower number of layers while having a back-up BWP with a higher number of layers such that in case a sudden unexpected high volume of data occurred, the network node 16 can rapidly move or switch the WD 22 to the back-up BWP with a higher number of layers via, e.g., a DCI including an indication to switch the active BWP, and also being able to rapidly come back to the normal or default mode (e.g., BWP with lower number of layers) after the high data burst is alleviated. The back-up BWP with higher numbers of layers can be applied to the other approaches as well.

Layer Reduction Based on Mobility and MIMO Transmission-Reception Robustness

In another embodiment, the network node 16 may determine to lower the number of layers, if one or more indications of a sudden change of channel conditions is obtained, or a change of channel conditions may happen between two CSI/SRS measurements instances, or they are not highly reliable. For example, the network node 16 may determine to change the active BWP and schedule the WD 22, before obtaining a CSI report, or SRS measurements. As such, the network node 16 may, such as for example, via processing circuitry 68, determine to first schedule the WD 22 using a lower number of layers than the maximum number of layers configured or expected for the BWP. Then, the network node 16, such as for example, via processing circuitry 68, based on WD 22 feedback either through HARQ acknowledgement/non-acknowledgement (ACK/NACK) records or indication(s), or after a CSI report, or after SRS measurements, may determine to increase the number of layers e.g., for PDSCH transmission. For example, the network node 16, such as for example, via processing circuitry 68 and/or radio interface 62, may schedule the WD 22 first/initially with a single layer, and if the network node 16 has repeatedly received HARQ ACKs, the network node 16 may, such as for example, via processing circuitry 68, determine to increase the number of layers. In further embodiments, the network node 16 may, such as for example, via processing circuitry 68 and/or radio interface 62, continue to increase the number of layers (e.g., used for PDSCH transmission to the WD 22) until a threshold is reached, such as, for example, the ratio of NACKs to the total HARQ ACKs/NACKs reaches an acceptable threshold level for the network node 16. Alternatively, or additionally, the network node 16, may, such as for example, via processing circuitry 68 and/or radio interface 62, first/initially schedule the WD 22 with a lower number of layer(s), and immediately also request from the WD 22 an aperiodic CSI report or SRS transmission, so that the network node 16 can evaluate the possibility of increasing the number of layers.

Layer Reduction Based on Channel Characteristics

In another embodiment, the network node 16, such as for example, via processing circuitry 68 and/or radio interface 62, may consider the channel conditions of the WD 22 in determining an empirical and/or useful MIMO layer limit. For example, for WDs 22 with good channel conditions (e.g., positioned relatively near the network node 16) but lacking richness in multipath propagation (e.g., line-of-sight (LOS)-dominant channels), transmission with a larger number of layers than 2-4, as using a larger number of RX antennas than that, is typically not useful for further increasing the achievable data rate. The network node 16 may then use the CSI report as a way to determine, for example, that higher-rank transmission is not likely to be useful and to determine to set a number of layers constraint while the WD 22 remains in such channel conditions. For example, CSI reports consistently indicating a low rank indication (RI) (e.g., RI may be a WD 22 indication of a number of layers) but high modulation and coding scheme (MCS) may indicate to the network node 16 that higher-rank transmission is not likely to be useful and to therefore set a constraint for a lower number of layers (e.g., 1 layer) while the WD 22 remains in such channel conditions.

Some embodiments of the present disclosure may include one or more of the following:

1. A method at network node 16 for MIMO transmission to a WD 22, the method including one or more of:
   determining a semi-dynamic constraint of a maximum useful or necessary number of MIMO layers for a WD 22, subject to network node 16 performance impact not exceeding a threshold, based on one or more scenario criteria and the achievable WD 22 PS gains;
   signaling the semi-dynamic constraint to the WD 22, e.g. via RRC signaling or performing BWP switching to a BWP with a suitable preconfigured constraint; and/or
   transmitting MIMO data to the WD 22 using the constraint.
2. Embodiment 1, wherein the scenario criteria include one or more of: pending or expected traffic, MIMO transmission robustness, channel conditions, amount of data in network node DL buffer for PDSCH for WD, historical traffic patterns, WD feedback, such as CSI, RI, MCS and/or HARQ indicator(s), etc.

In addition, some embodiments may include one or more of the following:

Embodiment A1. A network node configured to communicate with a wireless device (WD), the network node configured to, and/or comprising a radio interface and/or comprising processing circuitry configured to one or more of:
  determine a number of multiple-input multiple-output (MIMO) layers for the WD based at least in part on one or more parameters associated with the WD and/or the network node, the determined number of MIMO layers being adjusted as compared to a maximum number of MIMO layers associated with the WD;
  signal in an indication of the determined number of MIMO layers to the WD; and/or
  schedule and/or transmit a downlink (DL) channel to the WD based at least in part on the determined number of MIMO layers.

Embodiment A2. The network node of Embodiment A1, wherein one or more of:
  the one or more parameters includes at least one of WD power savings gains, network node performance impact, pending DL traffic to the WD, expected DL traffic to the WD, historical traffic patterns, MIMO transmission robustness, HARQ indication(s), WD feedback, channel state information (CSI) report(s), rank indication and/or modulation and coding scheme (MCS);
  the maximum number of MIMO layers associated with the WD being based on a WD capability;
  the maximum number of MIMO layers associated with the WD being a radio resource control (RRC) configured maximum number of MIMO layers for scheduling the WD;
  the network node and/or the radio interface and/or the processing circuitry is further configured to signal the indication semi-dynamically and/or semi-statically;
  the network node and/or the radio interface and/or the processing circuitry is further configured to signal via radio resource control (RRC) signaling and/or a downlink control information (DCI) message field; and/or
  the network node and/or the radio interface and/or the processing circuitry is further configured to determine by being configured to determine whether to reduce or increase the number of MIMO layers for scheduling the WD based at least in part on the one or more parameters.

Embodiment B1. A method implemented in a network node, the method comprising one or more of:
  determining a number of multiple-input multiple-output (MIMO) layers for the WD based at least in part on one or more parameters associated with the WD and/or the network node, the determined number of MIMO layers being adjusted as compared to a maximum number of MIMO layers associated with the WD;
  signaling an indication of the determined number of MIMO layers to the WD; and/or
  scheduling and/or transmitting a downlink (DL) channel to the WD based at least in part on the determined number of MIMO layers.

Embodiment B2. The method of Embodiment B1, wherein one or more of:
  the one or more parameters includes at least one of WD power savings gains, network node performance impact, pending DL traffic to the WD, expected DL traffic to the WD, historical traffic patterns, MIMO transmission robustness, HARQ indication(s), WD feedback, channel state information (CSI) report(s), rank indication and/or modulation and coding scheme (MCS);

the maximum number of MIMO layers associated with the WD being based on a WD capability;

the maximum number of MIMO layers associated with the WD being a radio resource control (RRC) configured maximum number of MIMO layers for scheduling the WD;

the method further comprises signaling the indication semi-dynamically and/or semi-statically;

the method further comprises signaling via radio resource control (RRC) signaling and/or a downlink control information (DCI) message field; and/or the method further comprises determining by determining whether to reduce or increase the number of MIMO layers for scheduling the WD based at least in part on the one or more parameters.

Embodiment C1. A wireless device (WD) configured to communicate with a network node, the WD configured to, and/or comprising a radio interface and/or processing circuitry configured to one or more of:

receive an indication of a number of multiple-input multiple-output (MIMO) layers, the indicated number of MIMO layers being determined based at least in part on one or more parameters associated with the WD and/or the network node and/or the indicated number of MIMO layers being adjusted as compared to a maximum number of MIMO layers associated with the WD; and/or receive a downlink (DL) channel transmission based at least in part on the determined number of MIMO layers.

Embodiment C2. The WD of Embodiment C1, wherein one or more of:

the one or more parameters includes at least one of WD power savings gains, network node performance impact, pending DL traffic to the WD, expected DL traffic to the WD, historical traffic patterns, MIMO transmission robustness, HARQ indication(s), WD feedback, channel state information (CSI) report(s), rank indication and/or modulation and coding scheme (MCS);

the maximum number of MIMO layers associated with the WD being based on a WD capability;

the maximum number of MIMO layers associated with the WD being a radio resource control (RRC) configured maximum number of MIMO layers for scheduling the WD;

the WD and/or the radio interface and/or the processing circuitry is further configured to receive the indication semi-dynamically and/or semi-statically;

the WD and/or the radio interface and/or the processing circuitry is further configured to receive the indication via radio resource control (RRC) signaling and/or a downlink control information (DCI) message field; and/or the indicated number of MIMO layers indicates a reduction or an increase in the number of MIMO layers for scheduling the WD based at least in part on the one or more parameters.

Embodiment D1. A method implemented in a wireless device (WD), the method comprising one or more of:

receiving an indication of a number of multiple-input multiple-output (MIMO) layers, the indicated number of MIMO layers being determined based at least in part on one or more parameters associated with the WD and/or the network node and/or the indicated number of MIMO layers being adjusted as compared to a maximum number of MIMO layers associated with the WD; and/or receiving a downlink (DL) channel transmission based at least in part on the determined number of MIMO layers.

Embodiment D2. The method of Embodiment D1, wherein one or more of:

the one or more parameters includes at least one of WD power savings gains, network node performance impact, pending DL traffic to the WD, expected DL traffic to the WD, historical traffic patterns, MIMO transmission robustness, HARQ indication(s), WD feedback, channel state information (CSI) report(s), rank indication and/or modulation and coding scheme (MCS);

the maximum number of MIMO layers associated with the WD being based on a WD capability;

the maximum number of MIMO layers associated with the WD being a radio resource control (RRC) configured maximum number of MIMO layers for scheduling the WD;

the method further includes receiving the indication semi-dynamically and/or semi-statically;

the method further includes receiving the indication via radio resource control (RRC) signaling and/or a downlink control information (DCI) message field; and/or the indicated number of MIMO layers indicates a reduction or an increase in the number of MIMO layers for scheduling the WD based at least in part on the one or more parameters.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node, the method comprising:
    determining a number of multiple-input multiple-output, MIMO, layers for a wireless device, WD, the determined number of MIMO layers being adjusted as compared to a maximum number of MIMO layers for the wireless device based at least in part on at least one parameter associated with at least one of the wireless device and the network node, the at least one parameter including at least one of pending downlink, DL, traffic to the wireless device, expected DL traffic to the wireless device, and historical traffic patterns;
    determining a power savings gain for the wireless device resulting from the adjustment of the determined number of MIMO layers as compared to the maximum number of MIMO layers, the at least one parameter further including the power savings gain; and
    signaling an indication of the determined number of MIMO layers to the wireless device.

2. The method of claim 1, further comprising at least one of:
    scheduling the wireless device according to the determined number of MIMO layers; and
    transmitting a downlink, DL, channel to the wireless device according to the determined number of MIMO layers.

3. A method implemented in a wireless device, the method comprising:
    receiving an indication of a number of multiple-input multiple-output, MIMO, layers, the indicated number of MIMO layers being adjusted as compared to a maximum number of MIMO layers for the wireless device based at least in part on at least one parameter associated with at least one of the wireless device and a network node, the at least one parameter including at least one of pending downlink, DL, traffic to the wireless device, expected DL traffic to the wireless device, and historical traffic patterns, the at least one parameter further including a power savings gain for the wireless device resulting from the adjustment of the determined number of MIMO layers as compared to the maximum number of MIMO layers.

4. A network node configured to communicate with a wireless device, WD, the network node comprising processing circuitry, the processing circuitry configured to cause the network node to:
    determine a number of multiple-input multiple-output, MIMO, layers for a wireless device, WD, the determined number of MIMO layers being adjusted as compared to a maximum number of MIMO layers for the wireless device based at least in part on at least one parameter associated with at least one of the wireless device and the network node, the at least one parameter including at least one of pending downlink, DL, traffic to the wireless device, expected DL traffic to the wireless device, and historical traffic patterns;
    determine a power savings gain for the wireless device resulting from the adjustment of the determined number of MIMO layers as compared to the maximum number of MIMO layers, the at least one parameter further including the power savings gain; and
    signal an indication of the determined number of MIMO layers to the wireless device.

5. The network node of claim 4, wherein the processing circuitry is further configured to at least one of:
    schedule the wireless device according to the determined number of MIMO layers; and
    transmit a downlink, DL, channel to the wireless device according to the determined number of MIMO layers.

6. The network node of claim 4, wherein the processing circuitry is configured to determine the number of MIMO layers for the wireless device by being configured to cause the network node to:
    determine to one of reduce and increase the number of MIMO layers for scheduling the wireless device as compared to the maximum number of MIMO layers for the wireless device based at least in part on the at least one parameter.

7. The network node of claim 4, wherein the at least one parameter includes a network node performance impact; and the processing circuitry is further configured to cause the network node to determine the network node performance impact associated with the determined number of MIMO layers.

8. The network node of claim 4, wherein the at least one parameter includes a MIMO transmission robustness; and the processing circuitry is further configured to cause the network node to determine the MIMO transmission robustness associated with the determined number of MIMO layers.

9. The network node of claim 4, wherein the at least one parameter includes at least one channel state information, CSI, report from the wireless device.

10. The network node of claim 4, wherein the at least one parameter includes at least one hybrid automatic repeat request, HARQ, indication from the wireless device.

11. The network node of claim 4, wherein the at least one parameter includes at least one feedback indication from the wireless device.

12. The network node of claim 4, wherein the at least one parameter includes at least one rank indication from the wireless device.

13. The network node of claim 4, wherein the at least one parameter includes at least one modulation and coding scheme, MCS, for the wireless device.

14. The network node of claim 4, wherein the maximum number of MIMO layers for the wireless device is based on the wireless device capability.

15. The network node of claim 4, wherein the maximum number of MIMO layers is configured to the wireless device via radio resource control, RRC, signaling; and
the indication of the determined number of MIMO layers is signaled to the wireless device via one of a downlink control information, DCI, message and an RRC message.

16. The network node of claim 4, wherein the maximum number of MIMO layers is configured to the wireless device at least one of per cell and per bandwidth part, BWP.

17. The network node of claim 4, wherein the indication of the determined number of MIMO layers is signaled to the wireless device via a downlink control information, DCI, message including an indication to switch an active bandwidth part, BWP.

* * * * *